Dec. 23, 1969   K. SIEGENTHALER   3,485,128
CUTTING OF WEB MATERIAL INTO STRIPS
Filed March 8, 1966   6 Sheets-Sheet 1
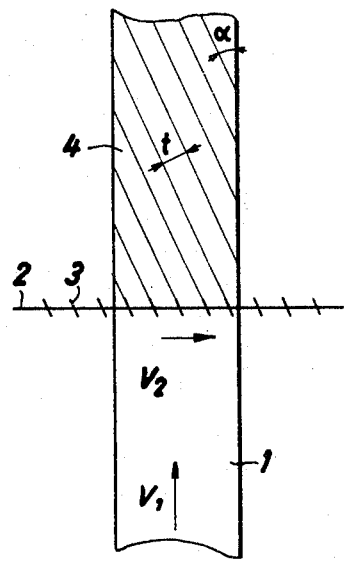
Fig. 1
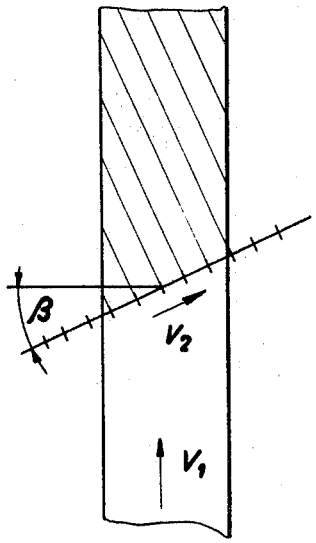
Fig. 2
Fig. 3
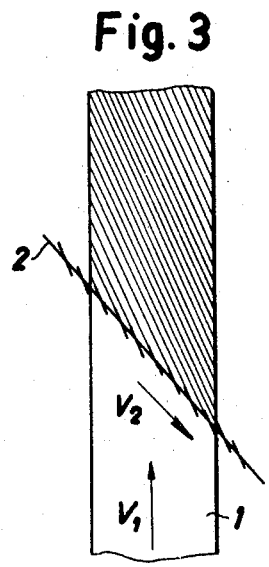
Fig. 4
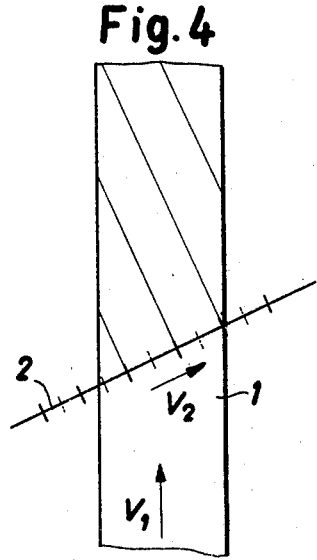
INVENTOR
KARL SIEGENTHALER
BY
Cushman, Darby & Cushman
ATTORNEYS

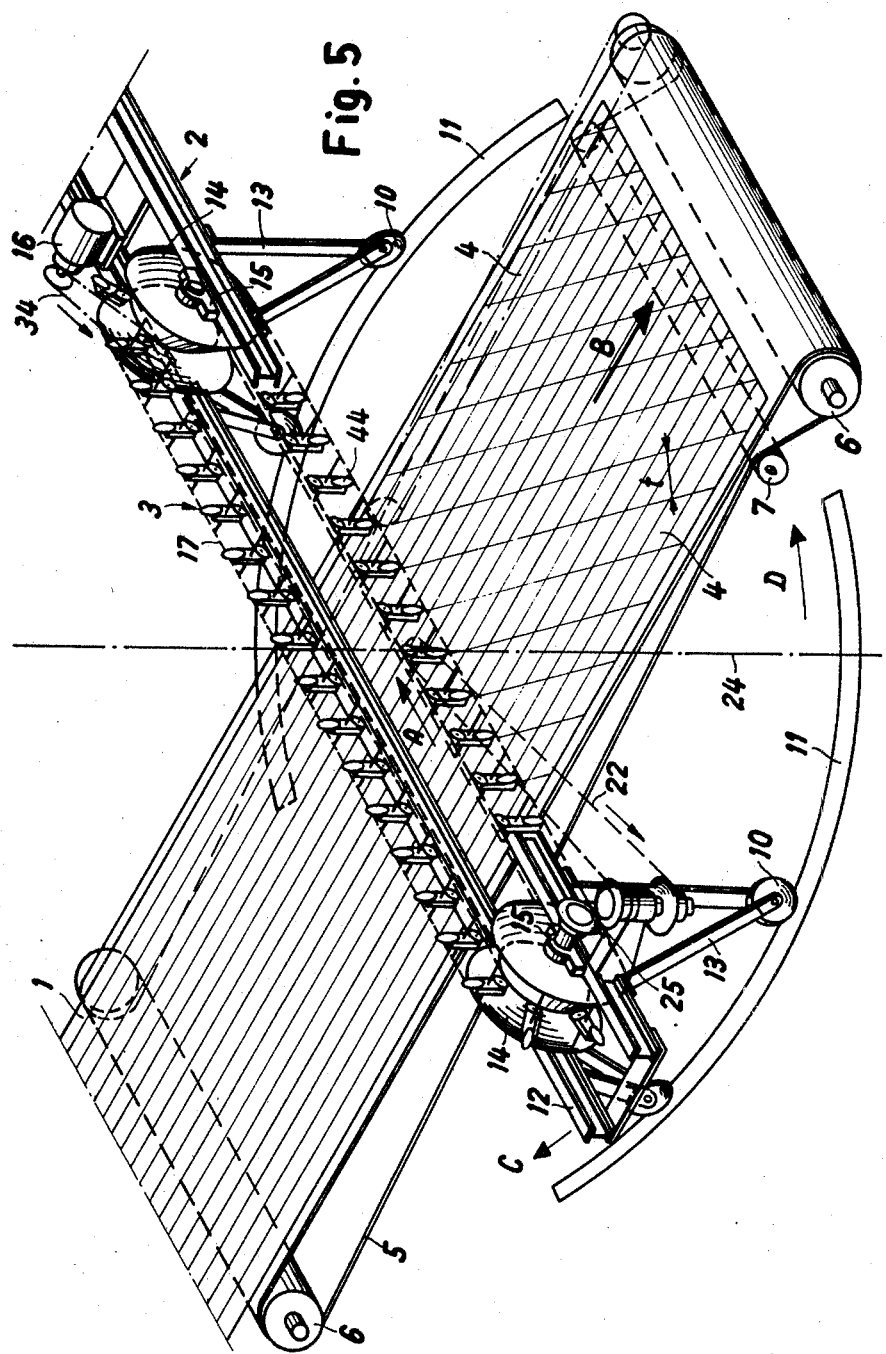

Dec. 23, 1969  K. SIEGENTHALER  3,485,128
CUTTING OF WEB MATERIAL INTO STRIPS
Filed March 8, 1966  6 Sheets-Sheet 3
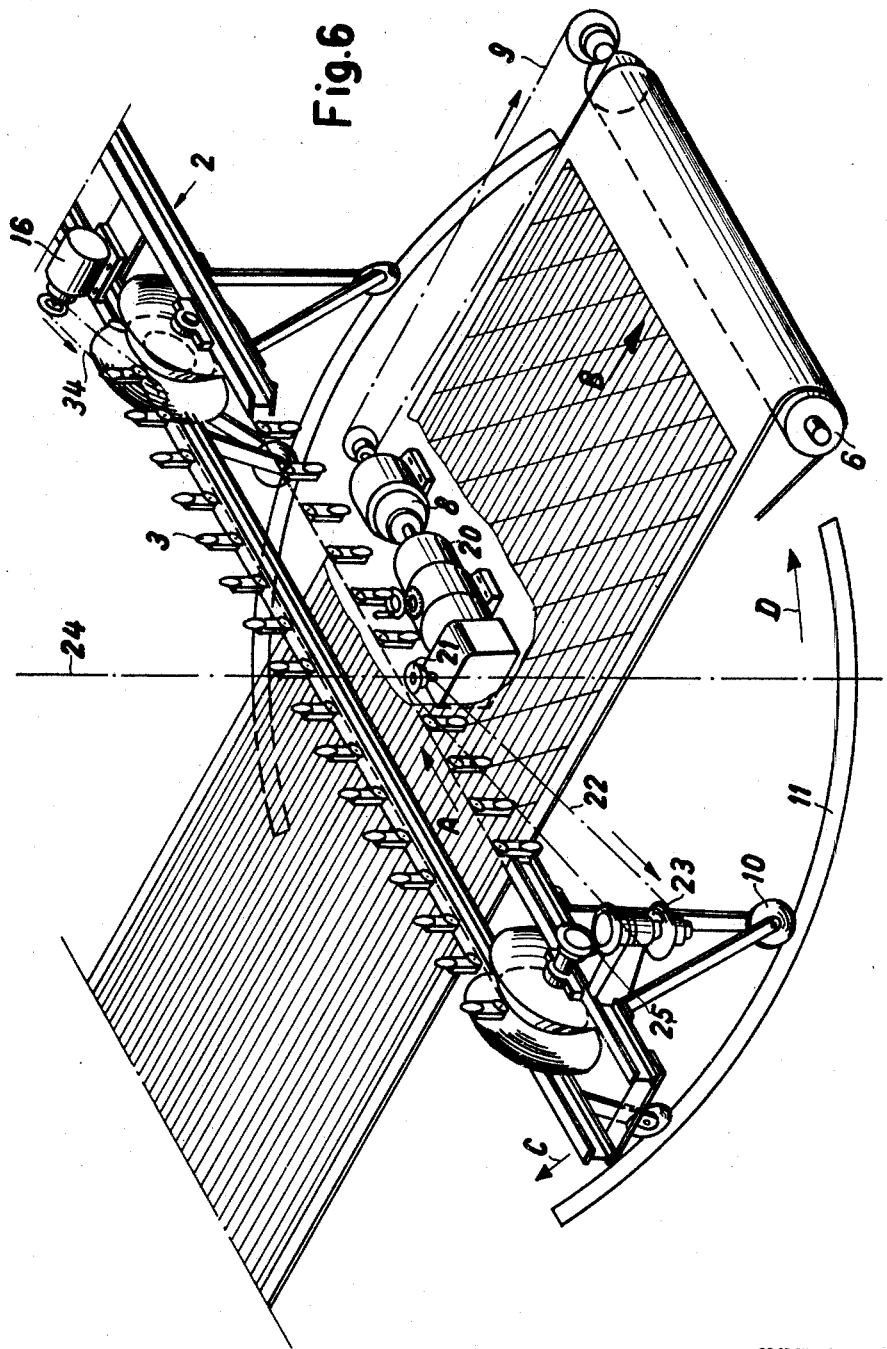
INVENTOR
KARL SIEGENTHALER
BY
Cushman, Darby & Cushman
ATTORNEYS

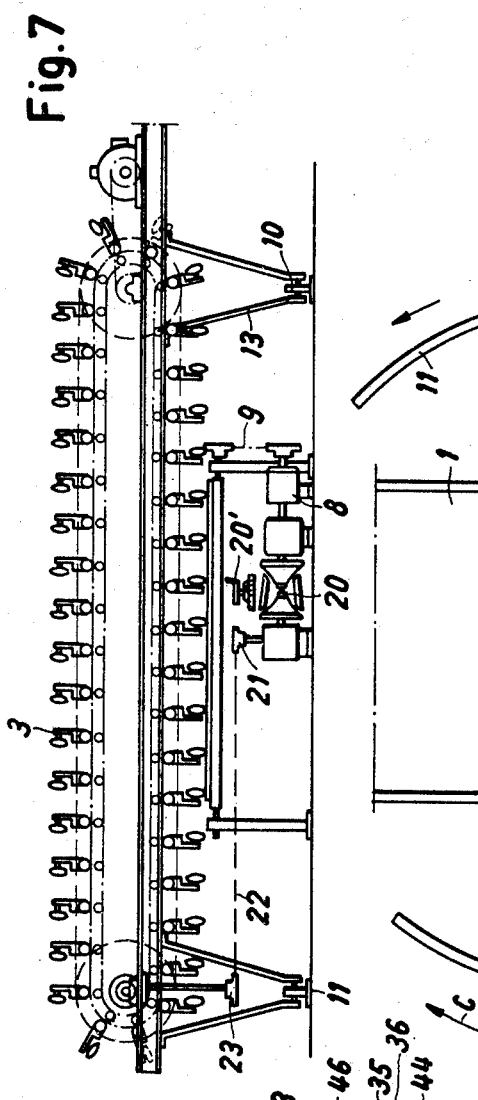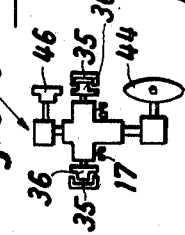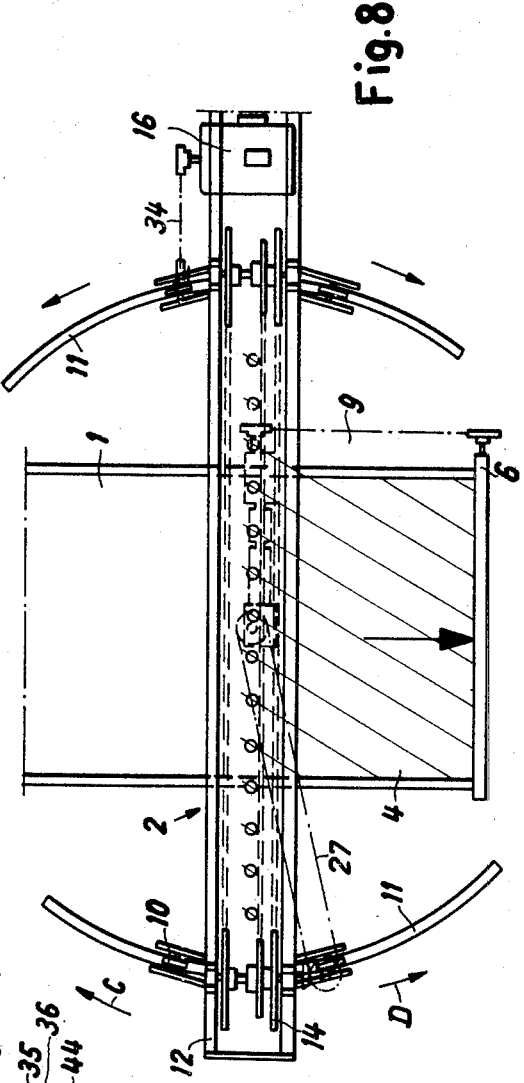

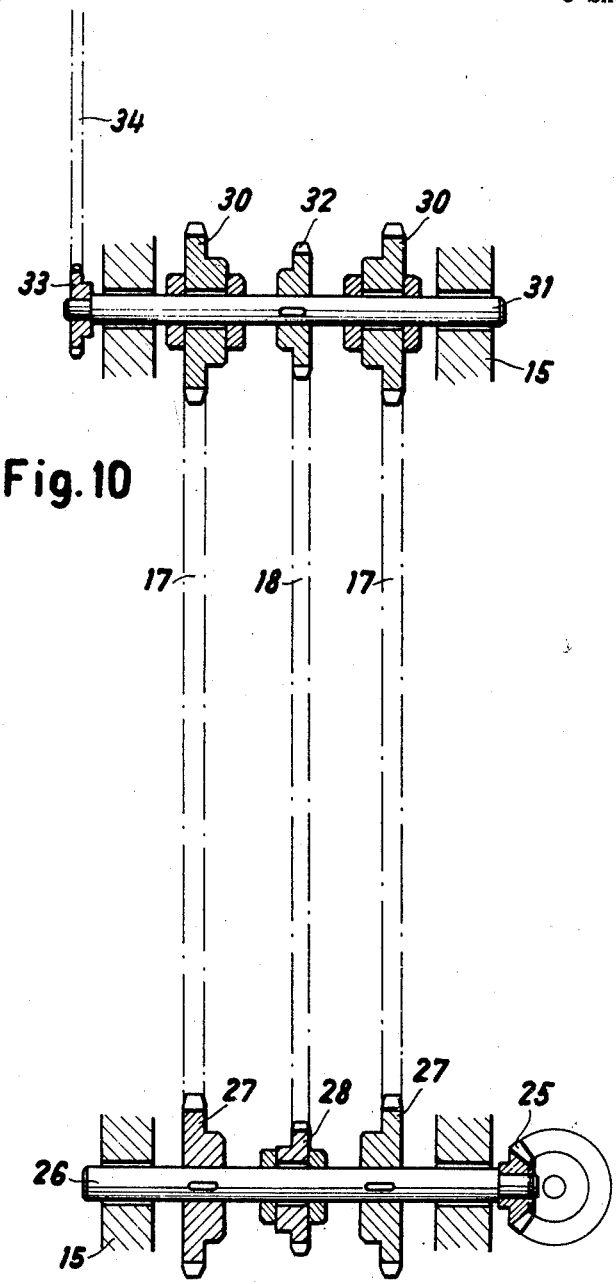

Dec. 23, 1969  K. SIEGENTHALER  3,485,128
CUTTING OF WEB MATERIAL INTO STRIPS
Filed March 8, 1966  6 Sheets-Sheet 6
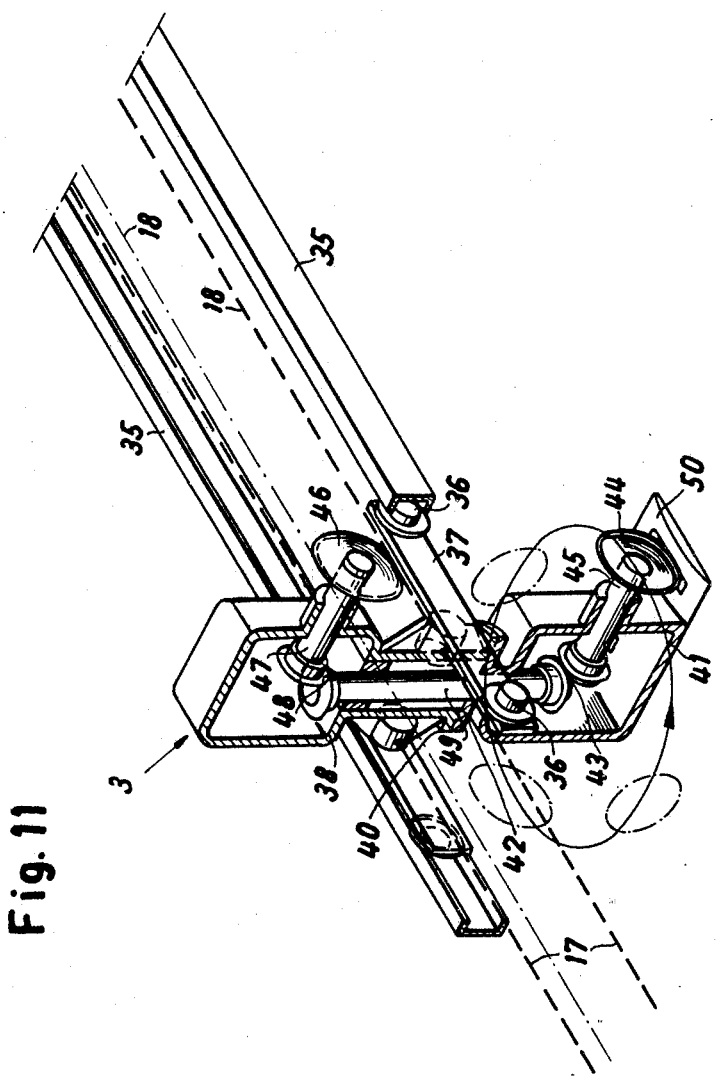
INVENTOR
KARL SIEGENTHALER
BY
Cushman Darby & Cushman
ATTORNEYS United States Patent Office 3,485,128
Patented Dec. 23, 1969

3,485,128
CUTTING OF WEB MATERIAL INTO STRIPS
Karl Siegenthaler, Pratteln, Switzerland, assignor to Fabrik fur Firestone Produkte AG., Pratteln, Switzerland, a corporation of Switzerland
Filed Mar. 8, 1966, Ser. No. 532,607
Claims priority, application Switzerland, Mar. 9, 1965, 3,233/65
Int. Cl. B26d 1/04
U.S. Cl. 83—326                              6 Claims

ABSTRACT OF THE DISCLOSURE

A bias cutting machine for cutting a continuously moving web into strips includes a plurality of cutting elements mounted in spaced apart relationship on an endless chain so as to be moved along a path across the web. The chain is supported by a framework which can be pivoted to change the angle of the path with respect to the direction of movement of the web so as to change the width of the strips.

---

The present invention concerns improvements in or relating to the cutting of web material into strips and is an improvement in or modification of the invention described in U.S. application of Wild and Siegenthaler Ser. No. 442,611 filed Mar. 25, 1965, now Patent No. 3,319,500.

In said Patent No. 3,319,500 there is described and claimed a method of cutting an elongate web of material into strips comprising continuously moving said web in a first linear direction which is along the length of said web and simultaneously moving a cutting device across the width of said web in a second linear direction transversely of said first linear direction whereby the web is cut into a plurality of strips which define an obtuse angle with the length of said web.

According to the present invention there is provided a method of cutting an elongate web of material into strips comprising moving the web in a direction parallel to its length, moving a plurality of spaced apart cutting devices across the web in a direction making an angle with the direction of movement of the web to cut the web into strips, and varying said angle as required to adjust the width of the strips cut from the web to a desired value.

The invention also provides apparatus for cutting an elongate web of material into strips comprising means for moving the web in a direction parallel to its length, means for moving a plurality of spaced apart cutting devices across the web in a direction making an angle with the direction of movement of the web to cut the web into strips, and means for varying said angle as required to vary the width of the strips cut from the web.

The invention will be described, merely by way of example, with reference to the accompanying drawings, in which:

FIGURES 1 to 4 inclusive illustrate diagrammatically the method of cutting web material into strips according to the present invention;

FIGURE 5 is a diagrammatic perspective view of apparatus according to one embodiment of the invention;

FIGURE 6 is a view substantially the same as that of FIGURE 5, but partially cut away to show part of the driving mechanism;

FIGURE 7 is a front elevation of the apparatus shown in FIGURES 5 and 6;

FIGURE 8 is a plan view of the apparatus shown in FIGURES 5 to 7;

FIGURE 9 is a side elevation of a cutting device employed in the apparatus of FIGURES 5 to 8;

FIGURE 10 illustrates part of the driving mechanism for the cutting devices employed in the apparatus of FIGURES 5 to 8, and FIGURE 11 is a perspective view, partly in section, showing a cutting device as employed in the apparatus of FIGURES 5 to 8.

FIGURES 1 to 4 illustrate diagrammatically the principles of the present invention. An elongate web 1 of material, for example, fabric or metal foil for use in the manufacture of vehicle tyres, is moved with a constant linear speed $v_1$ in the direction indicated by the arrow labelled $v_1$. At the same time, a plurality of equally spaced apart cutting devices, indicated diagrammatically at 3, is moved across the web 1 on a support member 2 at a constant linear speed $v_2$, in the direction indicated by the arrow labelled $v_2$. Each cutting device 3 forms a respective cut on the surface of the web 1, and as a result of the simultaneous respective movements of the web 1 and the cutting devices 3, the web 1 is cut into parallel strips 4, each of width $t$, and each extending in a direction inclined to the longitudinal direction of the web 1 at an angle $\alpha$, hereinafter referred to as the cutting angle.

In the manufacture of strips of material for vehicle tyres, different widths of strip are required to suit different types and sizes of tyre. Consequently, it is desirable to be able to adjust the width $t$ of the strips 4 formed by the cutting devices 3. In the machine described in Patent No. 3,319,500 the width of the strips was adjusted by varying the spacing between adjacent cutting devices 3. In the present invention, by contrast, the cutting devices 3 are mounted on the support 2 at fixed intervals and the width $t$ of strips 4 formed thereby is adjusted by varying the angular position of the support member 2 so as to vary the angle which the direction of movement $v_2$ of the cutting devices 3 makes with the direction of movement $v_1$ of the web 1.

Thus as illustrated in FIGURES 1 to 4 the support member 2 may be rotated in a plane parallel to the plane of the web 1 about an axis which passes through the longitudinal centre-line of the web 1. In FIGURE 1 the support member 2 is disposed at right angles to the direction of movement of the web 1, while in FIGURE 2 the support member 2 has been rotated through an angle $\beta$ from the position of FIGURE 1.

Rotation of the support member 2, as well as changing the width $t$ of the strips 4, also changes the cutting angle $\alpha$ of the strips. The relationship between the angles $\alpha$ and $\beta$ is as follows:

$$\cot \alpha = \frac{v_1}{v_2 \cos \beta} + \tan \beta$$

and in general the width $t$ of the strips 4 is given by:

$$t = d \cos (\alpha - \beta)$$

where $d$ is the distance separating adjacent cutting devices 3. Thus in FIGURE 1, where the cutting devices 3 move at right angles across the web 1, the angle $\beta$ is zero, and the thickness $t$ of the strips 4 is $d \cos \alpha$, where $$\alpha = \tan^{-1} (v_2/v_1)$$

FIGURE 2 illustrates the special case where $\beta = \alpha$, the width $t$ of the strips 4 then being a maximum, and equal to the separation $d$ of the cutting devices 3.

FIGURE 3 shows a further position of the support member 2 which gives a very small strip width $t$.

A strip width $t$ larger than the spacing $d$ between adjacent cutting devices 3 may, moreover, be obtained by putting selected cutting devices 3 out of action to vary, in effect, the spacing $d$. Thus, in FIGURE 4, alternate cutting devices 3 have been put out of action or removed, so that the width of the strips 4 formed, when the support member 2 is in the same angular position as that shown in FIGURE 2, is twice that formed with the arrangement of FIGURE 2. Alternatively, each second and third cutting device 3, or other selected cutting devices 3, may be put out of action as required. In order to provide for as many spacings between adjacent cutting devices 3 as possible it is preferable to employ a number of cutting devices 3 which is divisible by as many prime numbers as possible. Thus the number of cutting devices 3 may, for example, be 36, 40 or 60.

FIGURES 5 and 6 illustrate diagrammatically apparatus according to an embodiment of the invention for cutting a web 1 of textile material in which longitudinally extending threads predominate into oblique strips 4, as illustrated in FIGURES 1 to 4. The web 1 is supported on a moving endless belt conveyor 5 which is driven in the direction of arrow B at a constant speed $v_1$ around two end rollers 6 and over a tensioning roller 7. The rollers 6, 7 are supported in respective bearings in a frame (not shown). The conveyor belt 5 is driven, as shown in FIGURE 6, by an electric motor 8 which drives one of the end rollers 6 through an endless chain 9.

The support member 2 comprises a frame 12 mounted at each end on legs 13 which are provided with respective pairs of wheels 10.

The respective pairs of wheels 10 move on respective arcuate rails 11 on each side of the conveyor 6, the rails 11 having a common centre of curvature which coincides with a vertical axis 24 passing through the centre-line of the web 1.

Respective pairs of guide wheels 14 are journalled in respective bearings 15 to rotate about parallel horizontal axes at each end of the frame 12. A pair of parallel endless support chains 17 passes over the wheels 14, the cutting devices 3 being supported at equal intervals between the chains 17 as hereinafter described. The support chains 17 are driven, in a manner to be described, so that the cutting devices 3 in the lower flight of support chains 17 pass over the surface of the web 1 in the direction of arrow A at the speed $v_2$, making respective cuts in the web 1. The drive for the chains 17, which is shown in detail in FIGURE 10, is derived from the motor 8 (FIGURES 6, 7) through a continuously variable drive transmission 20. The drive transmission 20 drives an output shaft 21 the axis of rotation of which coincides with the vertical axis 24. A sprocket wheel on the output shaft 21 is drivingly connected to a sprocket wheel 23 mounted at one end of the frame 12 through an endless chain drive 22. The sprocket wheel 23 is connected through a bevel gear 25 to respective driving sprockets for the chains 17, as hereinafter described with reference to FIGURE 10.

Since the output shaft 21 is coaxial with the vertical axis of rotation 24 of the support member 2, drive transmission through the endless chain drive 22 to the support chains 17 is unaffected by pivotal movement of the support member 2 about the axis 24. Moreover, by driving the belt conveyor 5 and the endless chains 17 from a common electric motor 8, it is ensured that the ratio of the respective speeds $v_1$, $v_2$ of the web 1 and the cutting devices 3 respectively is constant. As will be clear from the foregoing analysis, the ratio of the speeds $v_1$, $v_2$ determines the cutting angle $\alpha$. This ratio can be adjusted to a desired value by means of a manual adjustment 20' provided on the variable drive transmission 20.

The driving motor for advancing the support chains 17 could, alternatively, be mounted on the frame 12 of the support member 2 in which case an electric synchro device could be provided for ensuring a constant speed ratio between this motor and the motor for driving the belt conveyor 5.

FIGURE 10 shows the driving arrangement for the cutting devices 3. The bevel gear 25 imparts drive from the chain drive 22 (FIGURE 6) to a shaft 26 which is journalled in the bearings 15. Two sprocket wheels 27 which drive the respective chains 17, are keyed onto the shaft 26, a further sprocket wheel 28 being loosely mounted on the shaft 26 between the sprocket wheels 27. A further shaft 31, parallel to the shaft 26, is journalled in the bearings 15 at the other end of the frame 12. Drive is imparted to the shaft 31 from a sprocket wheel 33 which is driven by an endless chain drive 34 from an electric motor 16 mounted on the frame 12 itself (FIGURE 6). The pair of chains 17 which are driven by the respective sprocket wheels 27, pass over respective sprocket wheels 30 which are loosely mounted on the shaft 31. A sprocket wheel 32 is keyed onto the shaft 31 between the sprocket wheels 30 and drives an endless chain 18, the other end of which passes over the sprocket wheel 28. The endless chain 18 drives each of the cutting elements of the cutting devices 3, as hereinafter described.

FIGURES 9 and 11 show a cutting device 3 in detail. Each cutting device 3 is guided during its cutting movement over the surface of the web 1 between two parallel channel section guide rails 35, each of which accommodates a respective roller 36 which is mounted on a cross member 37 attached to a housing 38 of the cutting device 3 (FIGURE 11). The housing 38 is provided at its lower end with a flange 40 which is in contact with a lower housing 41. The lower housing 41 is rotatable relative to the housing 38 about a vertical axis. The cutting element comprises a circular rotatable cutter blade 44 which is mounted on a shaft 45 which is journalled in the lower housing 41. Drive is imparted to the shaft 45 from the chain 18 through a spur wheel 46, a shaft 47 journalled in the housing 38, bevel gears 48, a shaft 49, and bevel gears 43.

Linear movement of the cutting device 3 across the web 1 is effected by the support chains 17, as described above, each of which is attached to the housing 38 on opposite respective sides thereof.

The cutter blade 44 of each cutting device 3 works in conjunction with a cutter plate 50 which is disposed beneath the web 1 to be cut. The chain-dotted lines in FIGURE 11 show how the cutter blade 44 can be pivoted by pivoting movement of the lower housing 41 into any desired position so that, for any angular position of the support member 2, the plane of the blade 44 may be inclined at the required cutting angle, $\alpha$, to the longitudinal direction of the web 1. The cutter blades 44 are set parallel to each other in accordance with the angular setting $\beta$ of the support member 2.

The guide rails 35 need be provided only in the cutting zone, that is, in the lower run of the support chains 18 as these pass over the web 1.

In order to allow for the cutting of wider strips from the web 1, as illustrated above in FIGURE 4, some of the cutting devices 3, for example, alternate cutting devices 3, are removable, or their blades 44 are so arranged that they may be pivoted out of engagement with the web 1.

It will be appreciated that the present invention is applicable generally to the cutting of any web material into strips. Moreover, any convenient cutting devices may be used in place of the rotary cutting devices 3 herein described. Thus, for example, where appropriate, shears, saws, or flame cutters may be used for cutting the web.

What I claim is:

1. Apparatus for cutting an elongate web of material into strips comprising means for continuously moving the web in a direction parallel to its length, means for moving a plurality of spaced apart cutting devices, each of which includes a rotatable cutting element, along a common path across the web in a direction making an angle with the direction of movement of the web to cut the web into strips, a driving member common to all said cutting elements, separate means associated with each of said cutting elements and with said common driving member for rotatably driving said cutting elements and means operatively associated with said cutting elements for varying the angle of said common path with respect to the direction of movement of the web to vary the width of the strips cut from the web.

2. Apparatus for cutting an elongate web of material into strips comprising: means for continuously moving the web in a direction parallel to its length; means for moving a plurality of spaced apart cutting devices along a common path across the web in a direction making an angle with the direction of movement of the web to cut the web into strips; guide means for guiding said cutting devices across the web, said guide means comprising a support member which extends across the web and which is pivotable about an axis which is perpendicular to the plane of the web and passes through the longitudinal centerline thereof; and means operatively associated with said cutting devices for varying the angle of said common path with respect to the direction of movement of the web to vary the width of the strips cut from the web, said last-named means including means pivotally mounting said support member for movement in a plane parallel to that of the web.

3. Apparatus as claimed in claim 2 in which said moving means includes stationary driving means having a driving wheel which is mounted for rotation about the pivot axis of the support member and further includes an endless member looped over said driving wheel for transmitting driving force to said cutting devices, whereby the drive transmission is unaffected by pivotal movement of the support member.

4. Apparatus for cutting an elongate web of material into strips comprising: means for continuously moving the web in a direction parallel to its length; means for moving a plurality of spaced apart rotatable cutting elements along a common path across the web in a direction making an angle with the direction of movement of the web to cut the web into strips; guide means for guiding said cutting elements across the web, said guide means comprising a support member extending across the web; and means operatively associated with said cutting elements for varying the angle of said common path with respect to the direction of movement of the web to vary the width of the strips cut from the web, said last-named means including means pivotally mounting said support member for movement in a plane parallel to that of the web and further including a motor mounted on said support member and an endless chain driven by said motor and at least two sprocket wheels, said endless chain rotatably driving said cutting elements.

5. Apparatus as in claim 4 wherein said means for moving said cutting devices across the web includes a second endless chain passing over at least two sprocket wheels, said cutting devices being mounted at fixed intervals along said second chain and wherein the sprocket wheels for the two endless chains are mounted for rotation about common axes at opposite ends of said support member.

6. Apparatus for cutting an elongate web of material into strips comprising: means for continuously moving the web in a direction parallel to its length; means for moving a plurality of spaced apart cutting devices along a common path across the web in a direction making an angle with the direction of movement of the web to cut the web into strips, said moving means including at least one endless chain passing over at least two sprocket wheels, the cutting devices being mounted at fixed intervals along said chain; guide means for guiding said cutting devices across the web, said guide means comprising a support member extending across the web; and means operatively associated with said cutting devices for varying the angle of said common path with respect to the direction of movement of the web to vary the width of the strips cut from the web, said last-named means including means pivotally mounting said support member for movement in a plane parallel to that of the web.

References Cited

UNITED STATES PATENTS

| | | | |
|---|---|---|---|
| 1,635,531 | 7/1927 | Brundage | 83—353 |
| 1,730,585 | 10/1929 | Midgley | 83—37 X |
| 2,538,972 | 1/1951 | Magnani | 83—37 X |
| 2,681,103 | 6/1954 | Hirsch. | |
| 2,727,571 | 12/1955 | Sayles | 83—484 |
| 2,283,838 | 5/1942 | Williams. | |
| 3,041,907 | 7/1962 | Gallagher | 83—482 |

ANDREW R. JUHASZ, Primary Examiner

U.S. Cl. X.R.

83—37, 353, 428, 483, 561